(12) United States Patent
Saitoh

(10) Patent No.: US 9,537,774 B2
(45) Date of Patent: Jan. 3, 2017

(54) TRANSMISSION APPARATUS AND METHOD FOR CONTROLLING TRANSMISSION BAND

(71) Applicant: FUJITSU LIMITED, Kawasaki-shi, Kanagawa (JP)

(72) Inventor: Satoru Saitoh, Kawasaki, PA (US)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 13/911,493

(22) Filed: Jun. 6, 2013

(65) Prior Publication Data
US 2014/0029426 A1 Jan. 30, 2014

(30) Foreign Application Priority Data
Jul. 24, 2012 (JP) .................. 2012-163572

(51) Int. Cl.
*H04L 12/801* (2013.01)
(52) U.S. Cl.
CPC ..................... *H04L 47/12* (2013.01)
(58) Field of Classification Search
None
See application file for complete search history.

(56) References Cited

U.S. PATENT DOCUMENTS

2002/0186655 A1* 12/2002 Kanazashi ............ H04L 47/30
370/229
2010/0103816 A1* 4/2010 Eiro .................... H04L 12/4625
370/230

FOREIGN PATENT DOCUMENTS

| JP | 2000-78146 | 3/2000 |
|---|---|---|
| JP | 2007-194732 | 8/2007 |
| JP | 2011-223144 | 11/2011 |

OTHER PUBLICATIONS

Office Action issued by the Japanese Patent Office on Mar. 22, 2016 in corresponding Japanese patent application No. 2012-163572.
Notification of Reasons for Refusal issued by the Japanese Patent Office on Oct. 25, 2016 in the corresponding Japanese patent application No. 2012-163572.

* cited by examiner

*Primary Examiner* — Yemane Mesfin
*Assistant Examiner* — Jeff Banthrongsack
(74) *Attorney, Agent, or Firm* — Staas & Halsey LLP

(57) ABSTRACT

A transmission apparatus includes: a frame transmitter configured to receive an asynchronous first frame transmitted via a first transmission network and arrange the received first frame to a second frame to transmit the arranged second frame to a second transmission network; a congestion detector configured to detect congestion that has occurred in an asynchronous transmission apparatus that receives the first frame via the first transmission network; and a band controller configured to control a transmission band of a path so as to reduce the transmission band of a path on the second transmission network corresponding to a path on which the congestion has occurred.

7 Claims, 9 Drawing Sheets

FIG. 4

| | FIRST BIT | SECOND BIT | THIRD BIT | FOURTH BIT | FIFTH BIT | SIXTH BIT | SEVENTH BIT | EIGHTH BIT |
|---|---|---|---|---|---|---|---|---|
| FIRST ROW | BWR_IND | | | | | 0 | | |
| SECOND ROW | BWR_IND | NCS | | | 0 | | | |
| THIRD ROW | CRC-3 | | | | 0 | | | |

BIT USED FOR INSTRUCTING CHANGE OF BAND OF ODUflex

TRANSMISSION APPARATUS AND METHOD FOR CONTROLLING TRANSMISSION BAND

CROSS-REFERENCE TO RELATED APPLICATION

This application is based upon and claims the benefit of priority of the prior Japanese Patent Application No. 2012-163572, filed on Jul. 24, 2012, the entire contents of which are incorporated herein by reference.

FIELD

The embodiments discussed herein are related to a transmission apparatus and a method for controlling a transmission band.

BACKGROUND

There has been known a transmission apparatus configured to receive an asynchronous frame as a first frame, arrange the asynchronous frame in a second frame which is different from the first frame, and transmit the first frame via a second transmission network which is different from an asynchronous transmission network as a first transmission network via which the first frame has been transmitted. Example of the transmission apparatus includes a synchronous optical network/synchronous digital hierarchy (SONET/SDH) add/drop multiplexer (ADM) unit that arranges an asynchronous frame in a synchronous frame on a synchronous transmission network. Also, an ADM unit that arranges an asynchronous frame in an optical transport network (OTN) frame and transmits the asynchronous frame on the OTN has been known. The transmission apparatus arranges a frame received from the first transmission network to a time-sharing multiplexed frame on the second transmission network. Examples of the first transmission network (the asynchronous network) include a layer 2 (L2) network and an Internet protocol (IP) network. Also, the transmission apparatus extracts the frame on the asynchronous transmission network from the time-sharing multiplexed frame received from the second transmission network.

An optical channel data unit, flexible (ODUflex), is recommended by International Telecommunication Union Telecommunication Standardization Sector (ITU-T) recommendation G.709. The ODUflex is an optical channel data unit (ODU) signal which may give a variable-speed payload.

As an example of the related art, a technology of allocating an Ethernet (registered trademark) as a logic interface and arranging the Ethernet (registered trademark) to a virtual container (VC) of the SDH, a virtual concatenation (VCAT) of the ODU of the OTN or the ODUflex has been known. Also, a technology is known in which, by arranging an Ethernet (registered trademark) to a VC group or an ODU group corresponding to a rate of the Ethernet using the VCAT or the ODUflex, Ethernets (registered trademark) with different rates are allocated as logic interfaces.

Japanese Laid-open Patent Publication No. 2011-223144 is an example of the related art.

SUMMARY

According to an aspect of the invention, a transmission apparatus includes: a frame transmitter configured to receive an asynchronous first frame transmitted via a first transmission network and arrange the received first frame to a second frame to transmit the arranged second frame to a second transmission network; a congestion detector configured to detect congestion that has occurred in an asynchronous transmission apparatus that receives the first frame via the first transmission network; and a band controller configured to control a transmission band of a path so as to reduce the transmission band of a path on the second transmission network corresponding to a path on which the congestion has occurred.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a tributary slot overhead (ODUk-TSOH);

DESCRIPTION OF EMBODIMENTS

When the asynchronous frame as the first frame is arranged in the second frame which is different from the first frame and is transmitted, there might be cases where, due to frame congestion in the asynchronous transmission network as the first transmission network, the actual transmission rate of a path that transmits the frame is smaller than that of a transmission band ensured by the second transmission network which is different from the first transmission network. In this case, a part of the ensured transmission band is not used, and therefore, the efficiency of use of band of the second transmission network is reduced.

According to embodiments described below, a transmission apparatus and a method for controlling a transmission band which increase the efficiency of use of a transmission band of a second transmission network in which a first frame is arranged in a second frame and transmitted is provided.

First Embodiment

1. System Configuration Example

Figure 1:
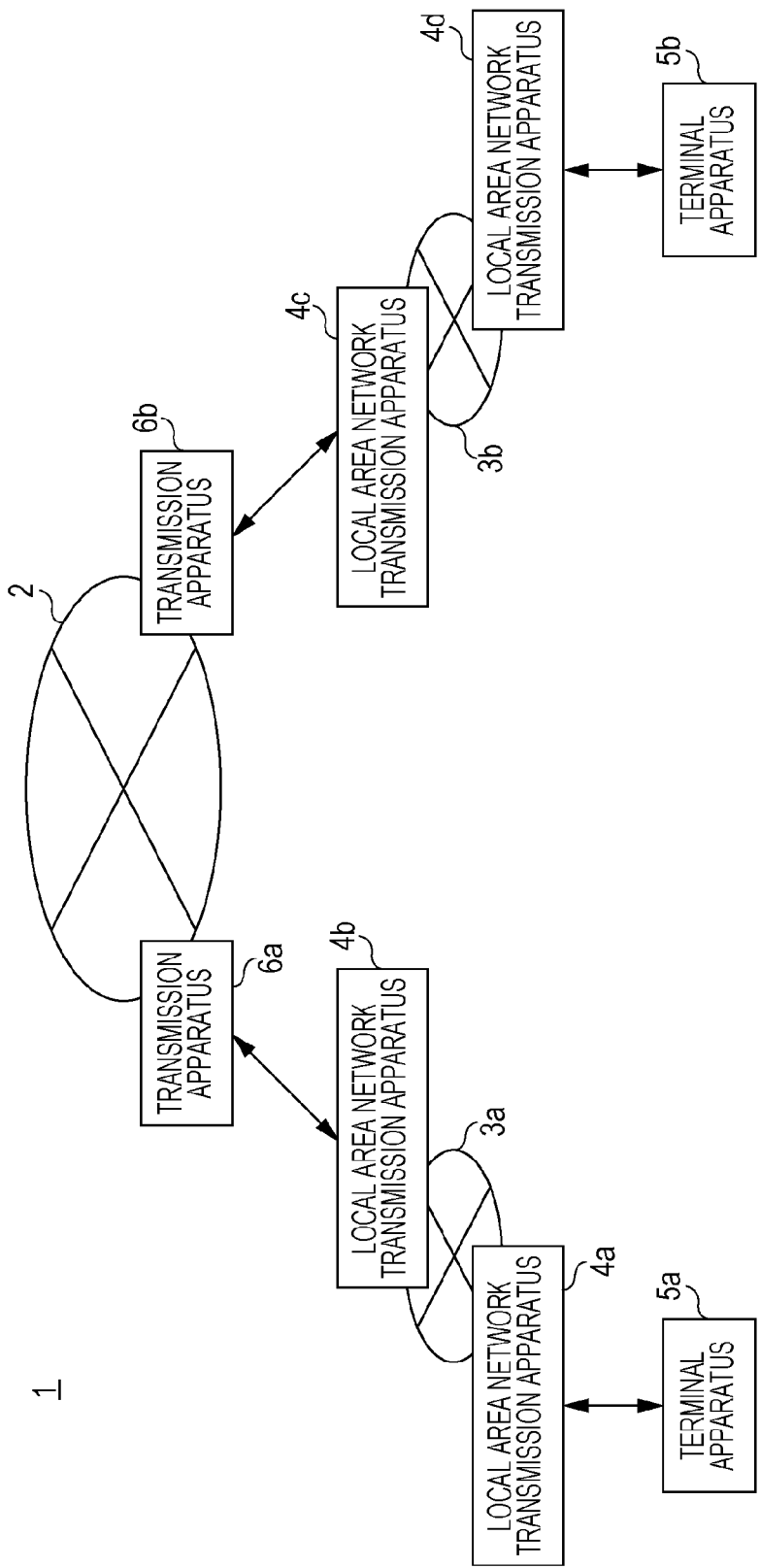
FIG. 1 is a diagram illustrating an example configuration of a communication system.

Hereinafter, a preferred embodiment will be described with reference to the accompanying drawings. FIG. 1 is a diagram illustrating an example configuration of a communication system. A communication system 1 includes a transmission network 2, local area networks 3a and 3b serving as asynchronous transmission networks, local area network transmission apparatuses 4a to 4d, terminal apparatuses 5a and 5b, and transmission apparatuses 6a and 6b. In the following description, the local area networks 3a and 3b might be collectively referred to as "local area networks 3" hereinafter. The local area network transmission apparatuses 4a to 4d might be collectively referred to as "local area network transmission apparatuses 4" hereinafter. The terminal apparatuses 5a and 5b might be collectively referred to as "terminal apparatuses 5" hereinafter. The transmission apparatuses 6a and 6b might be collectively referred to as "transmission apparatuses 6" hereinafter.

Assume a case where client data is transmitted between the terminal apparatuses 5a and 5b. The terminal apparatus 5a is connected to the transmission apparatus 6a via the local area network 3a and the local area network transmission apparatuses 4a and 4b, and the terminal apparatus 5b is connected to the transmission apparatus 6b via the local area network 3b and the local area network transmission apparatuses 4c and 4d. Between the transmission apparatuses 6a and 6b that oppose each other, a path that transmits the client data between the terminal apparatuses 5a and 5b is set on the transmission network 2.

The transmission apparatus 6a arranges the client data received from the terminal apparatus 5a via the local area network 3a and the local area network transmission apparatuses 4a and 4b in an area of a frame flowing in the path set on the transmission network 2. In the following description, a frame transmitted on the transmission network 3 might be referred to as a "first frame" and a frame transmitted on the transmission network 2 might be referred to as a "second frame". The transmission apparatus 6a takes client data from the second frame transmitted by the path set on the transmission network 2 and transmits the client data to the terminal apparatus 5a via the local area network 3a and the local area network transmission apparatuses 4a and 4b. The transmission apparatus 6b arranges and extracts client data in a similar manner.

In an embodiment, the transmission apparatus 6 may be an ADM apparatus that transmits an OTN frame flowing in the transmission network 2 serving as an OTN network. The local area network transmission apparatus 4 may be a router that transmits a frame transmitted via the local area network 3 serving as an IP network. In another embodiment, the transmission network 2 may be a synchronous transmission network, such as a SONET/SDH network and so forth, and the transmission apparatus 6 may be an apparatus, such as a SONET/SDH ADM apparatus, that transmits a synchronous frame. Note that the above-described examples are not intended to limit use of signal processing disclosed herein to a communication system that transmits data via an OTN network and an IP network. The communication system 1 will be hereinafter described using an example where a frame transmitted via the transmission network 2 is an OTN frame and the local area network 3 is an IP network. However, the example is not intended to limit signal processing disclosed herein to transmission processing for an OTN frame and an IP packet.

2. Example Hardware Configuration

Figure 2:
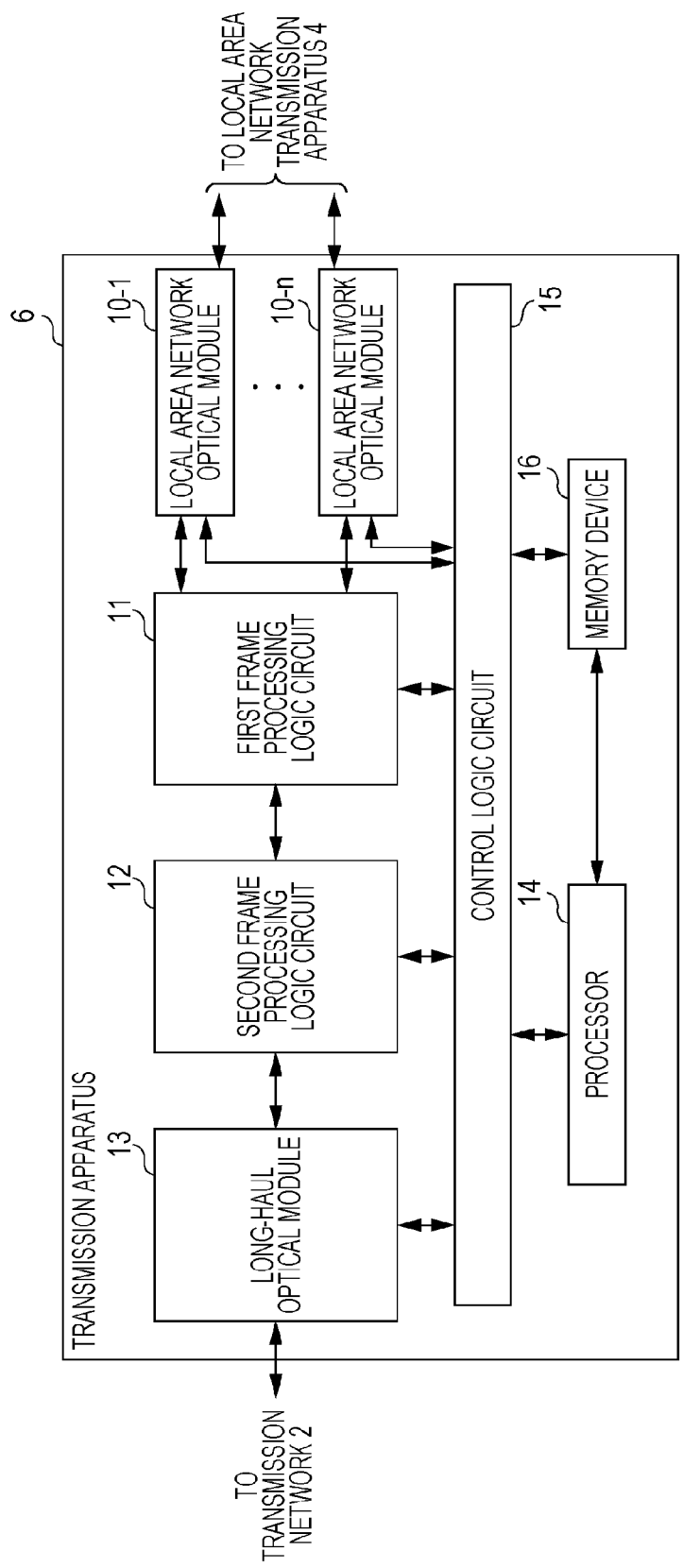
FIG. 2 is a block diagram illustrating an example hardware configuration of a transmission apparatus.

FIG. 2 is a block diagram illustrating an example hardware configuration of the transmission apparatus 6. The transmission apparatus 6 includes local area network optical modules 10-1 to 10-n, a first frame processing logic circuit 11, a second frame processing logic circuit 12, and a long-haul optical module 13. The transmission apparatus 6 includes a processor 14, a control logic circuit 15, and a memory device 16. In the following description, the local area network optical modules 10-1 to 10-n might be collectively referred to as "local area network optical modules 10". Note that the hardware configuration illustrated in FIG. 2 is merely an example for describing this embodiment. In addition to transmission apparatuses disclosed herein, any other hardware configuration which enables execution of an operation described below may be employed.

The local area network optical module 10 is connected to an optical fiber of the local area network 3, transmits and receives an optical signal of the first frame transmitted on the local area network 3, and performs conversion between an optical signal and an electric signal. The first frame processing logic circuit 11 arranges a packet transmitted on the local area network 3 in the ODU signal. Also, the first frame processing logic circuit 11 takes a packet from the ODU signal separated from the OTU frame transmitted on the transmission network 2. The first frame processing logic circuit 11 may be realized, for example, by a large scale integration (LSI), such as a field-programming gate array (FPGA), an application specific integrated circuit (ASIC), and so forth.

The second frame processing logic circuit 12 multiplexes the ODU signal in which the packet is arranged to generate an OTU frame. The ODU signal is separated from the OTU frame transmitted on the transmission network 2. The second frame processing logic circuit 12 may be realized, for example, by an LSI, such as an FPGA, an ASIC, and so forth. The long-haul optical module 13 is connected to an optical fiber of the transmission network 2, transmits and receives an optical signal transmitted on the transmission network 2, and performs conversion between an optical signal and an electric signal.

The processor 14 controls an operation of the transmission apparatus 6, and performs setting for the local area network optical module 10, the first frame processing logic circuit 11, the second frame processing logic circuit 12, and the long-haul optical module 13. Also, the processor 14 executes an operation of changing a transmission band of a path, which will be described below.

The control logic circuit 15 connects the processor 14, the local area network optical module 10, the first frame processing logic circuit 11, the second frame processing logic circuit 12, and the long-haul optical module 13. The control logic circuit 15 performs monitoring of the local area network optical module 10, the first frame processing logic circuit 11, the second frame processing logic circuit 12, and the long-haul optical module 13. The control logic circuit 15 may be realized, for example, by an LSI, such as an FPGA, an ASIC, and so forth.

A control program for operation control for the transmission apparatus 6 executed by the processor 14 and an operation of changing the transmission band of the path set on the transmission network 2 is stored in the memory device 16. Also, a control program that is to be executed by the control logic circuit 15 may be stored in the memory device 16. The memory device 16 may be configured to include a nonvolatile memory device, a read only memory (ROM), a random access memory (RAM), and so forth.

3. Example Functional Configuration

Figure 3:
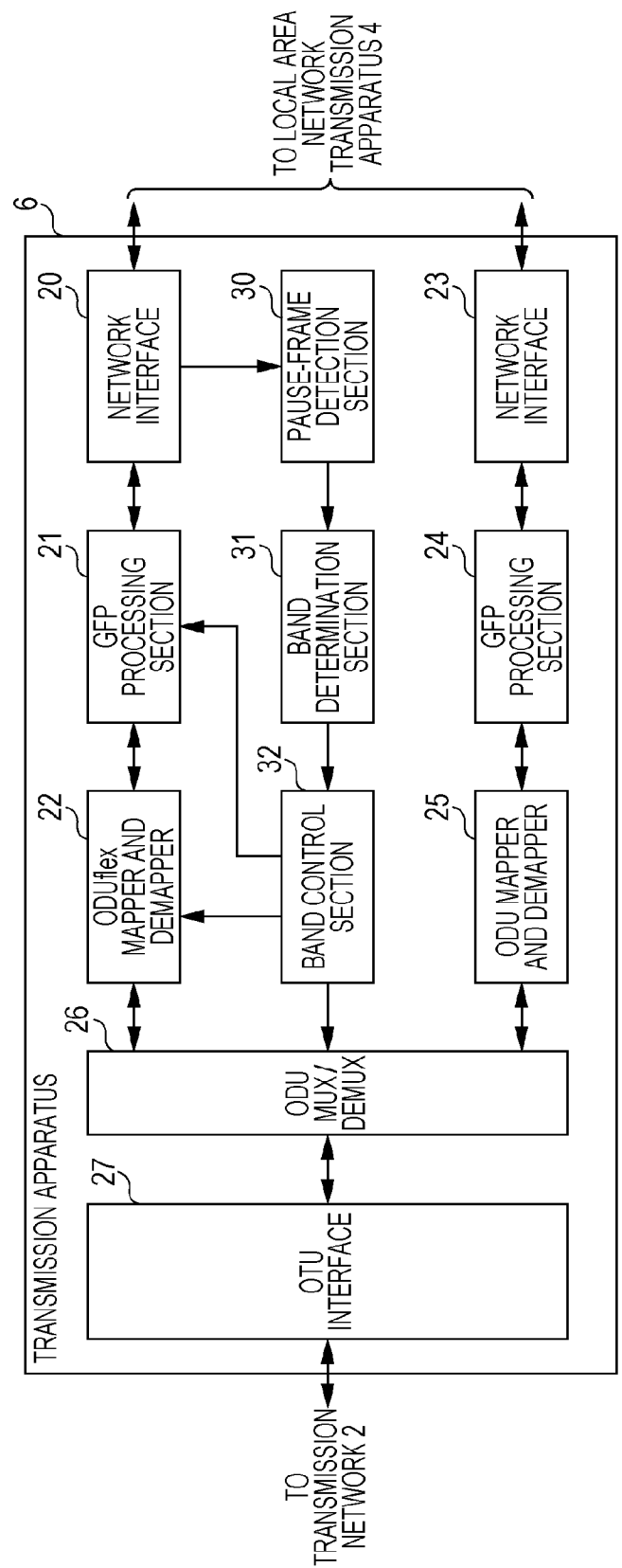
FIG. 3 is a block diagram illustrating a first example of a functional configuration of a transmission apparatus.

Subsequently, a function of the transmission apparatus 6 realized by the hardware configuration of FIG. 2 will be described. FIG. 3 is a block diagram illustrating a first example of a functional configuration of the transmission apparatus 6. The transmission apparatus 6 includes network interfaces 20 and 23, generic framing procedure (GFP) processing sections 21 and 24, an ODUflex mapper and demapper 22, and an ODU mapper and demapper 25. The transmission apparatus 6 includes an ODU multiplexer and demultiplexer 26 and an OTU interface 27. The transmission apparatus 6 includes a pause-frame detection section 30, a band determination section 31, and a band control section 32.

Functions of the network interfaces 20 and 23, the GFP processing sections 21 and 24, the ODUflex mapper and demapper 22, the ODU mapper and demapper 25, the ODU multiplexer and demultiplexer 26, and the OTU interface 27 are one example of functions included in a frame transmitter. Functions of the pause-frame detection section 30 are one example of functions included in a congestion detector. Functions of the band determination section 31 and the band control section 32 are one example of functions included in a band controller.

Note that, in the following description and the accompanying drawings, a multiplexer and a demultiplexer might be referred to as a "MUX" and "DEMUX", respectively. Also, the functional configuration diagram of FIG. 3 mainly illustrates a configuration regarding the function of the transmission apparatus 6 described herein. The transmission apparatus 6 may include some element other than elements illustrated in FIG. 3. The same is applied to functional configuration diagrams of FIG. 6 and FIG. 8.

Each of the network interfaces 20 and 23 is an interface with the local area network transmission apparatus 4, performs signal processing of an Ethernet (registered trademark) of 10 Gb/s, and transmits a received L2 frame to a corresponding one of the GFP processing sections 21 and 24. Also, each of the network interfaces 20 and 23 receives an L2 frame from the corresponding one of the GFP processing sections 21 and 24 and transmits the received L2 frame to the local area network transmission apparatus 4.

The GFP processing section 21 encapsulates the L2 frame received from the network interface 20 into a GFP frame in accordance with a transmission band specified by the band control section 32. The band control section 32 controls the transmission band of the path. The transmission band of the path is changed by changing the number of tributary slots of the ODUflex in use. A tributary slot might be referred as a "TS" in the following description.

The GFP processing section 24 encapsulates the L2 frame received from the network interface 23 into a GFP frame. The GFP processing sections 21 and 24 transmit the GFP frames into which the L2 frames have been encapsulated to the ODUflex mapper and demapper 22 and the ODU mapper and demapper 25, respectively. Also, the GFP processing sections 21 and 24 decapsulate the GFP frames received from the ODUflex mapper and demapper 22 and the ODU mapper and demapper 25, take the L2 frames, and transmit the L2 frames to the network interfaces 20 and 23, respectively.

The ODUflex mapper and demapper 22 arranges the GFP frame received from the GFP processing section 21 to the ODUflex signal in accordance with the transmission band specified by the band control section 32 and transmits the resultant to the ODU MUX/DEMUX 26. That is, the ODUflex mapper and demapper 22 arranges the GFP frames to TSs of a number determined for each path by the band control section 32.

The ODU mapper and demapper 25 arranges the GFP frame received from the GFP processing section 24 to the ODU signal and transmits the resultant to the ODU MUX/DEMUX 26. The ODU MUX/DEMUX 26 multiplexes the ODUflex signal and the ODU signal received from the ODUflex mapper and demapper 22 and the ODU mapper and demapper 25 to ODU signals in a higher hierarchy, respectively. The ODU MUX/DEMUX 26 divides the ODU signal received from the OTU interface 27 into an ODUflex signal and an ODU signal in a lower hierarchy, and transmits the ODUflex signal and the ODU signal to the ODUflex mapper and demapper 22 and the ODU mapper and demapper 25, respectively.

The OTU interface 27 arranges the ODU signal multiplexed by the ODU MUX/DEMUX 26 in the OTU frame and transmits the multiplexed OTU frame to the transmission network 2. The OTU interface 27 takes the ODU signal from the OTU frame received from the transmission network 2 and transmits the ODU signal to the ODU MUX/DEMUX 26.

The pause-frame detection section 30 detects a pause frame from the L2 frames transmitted from the local area network transmission apparatus 4. The pause frame is a frame for which the local area network transmission apparatus 4 requests an opposing local area network transmission apparatus 4 to interrupt frame transmission. An example of the pause frame is a frame standardized in accordance with the Institute of Electrical and Electronics Engineers (IEEE) 802.3x. For example, when packet congestion occurs in the local area network transmission apparatus 4, the local area network transmission apparatus 4 outputs the pause frame.

The pause frame may be configured to specify a transmission interruption period of the opposing local area network transmission apparatus 4. Also, the pause frame may be configured to be able to specify cancellation of transmission interruption of the local area network transmission apparatus 4. For example, the pause frame may be configured to specify cancellation of transmission interruption by specifying a transmission interruption period of "0". For example, the pause frame standardized in accordance with IEEE 802.3x includes an information element "pause_time". The pause_time is one of integers of "0" to "65,535" and the transmission interruption period is specified by a product of a value of the pause_time and a 512 bit time.

Hereinafter, this embodiment will be further described using an example of the pause frame standardized in accordance with IEEE 802.3x. However, this example is not intended to limit the pause frame used by the transmission apparatus disclosed herein to the pause frame standardized in accordance with IEEE 802.3x.

The band determination section 31 determines whether or not the transmission band of the path for which frame transmission interruption and cancellation thereof is controlled by the pause frame, that is, the transmission band of the path relayed by the local area network transmission apparatus 4 as a transmission source of the pause frame is to be reduced. In this case, the band determination section 31 calculates the ratio of a cumulative period of the transmission interruption period specified by the pause_time to a predetermined measurement period. The band determination section 31 determines, in accordance with the calculated ratio, whether or not the transmission band is to be reduced. For example, the band determination section 31 calculates the currently ensured transmission band and an effective transfer rate of the path in accordance with the ratio of the cumulative period to the measurement period. The band determination section 31 may be configured to determine whether or not the transmission band is to be reduced in accordance with whether or not a difference or the ratio between the ensured transmission band and the effective transfer rate exceeds a threshold.

Also, for example, the band determination section 31 may be configured to determine, when the number of TSs currently ensured in the path is "n", whether or not the number of TSs ensured in the path is to be reduced by 1 in accordance with whether or not ((the measurement period—the cumulative period)/the measurement period) is smaller than ((n−1)/n). If the band determination section 31 determines that the number of TSs is to be reduced, the band control section 32 reduces the transmission band of the ODUflex.

When reducing the transmission band of the ODUflex, the band control section 32 transmits an instruction signal instructing reduction of the transmission band of the ODUflex to an opposing transmission apparatus 6. In the following description, the instruction signal might be referred to as a "reduction instruction signal". The reduction instruction signal is multiplexed to the ODU signal by the ODU MUX/DEMUX 26. In response to the reduction instruction signal, the opposing transmission apparatus 6 reduces the number of TSs ensured in the path.

The band control section 32 may be configured to use, for example, a predetermined bit in the tributary slot overhead (ODUk-TSOH) for the reduction instruction signal. FIG. 4 is a diagram illustrating of a first row to a third row of a fifteenth column of the ODUk-TSOH. A first bit of each of the first row and the second row is a bandwidth resize indicator (BWR_IND) bit representing that transfer rate change is to be performed. A second bit of the second row is a network connectivity status (NCS) bit, and first to third bits of the second row are error correction codes. For example, the band control section 32 may be configured to use a value of the second bit or the third bit of the first row of the fifteenth column of the ODUk-TSOH as a transmission instruction signal.

Note that the above-described operations of the network interfaces 20 and 23, the GFP processing sections 21 and 24, the ODUflex mapper and demapper 22, the ODU mapper and demapper 25, and the pause-frame detection section 30 are executed by the first frame processing logic circuit 11 illustrated in FIG. 2. The above-described operations of the ODU MUX/DEMUX 26 and the OTU interface 27 are executed by the second frame processing logic circuit 12. The above-described operations of the band determination section 31 and the band control section 32 are executed by the processor 14.

4. Description of Operation

Figure 5:
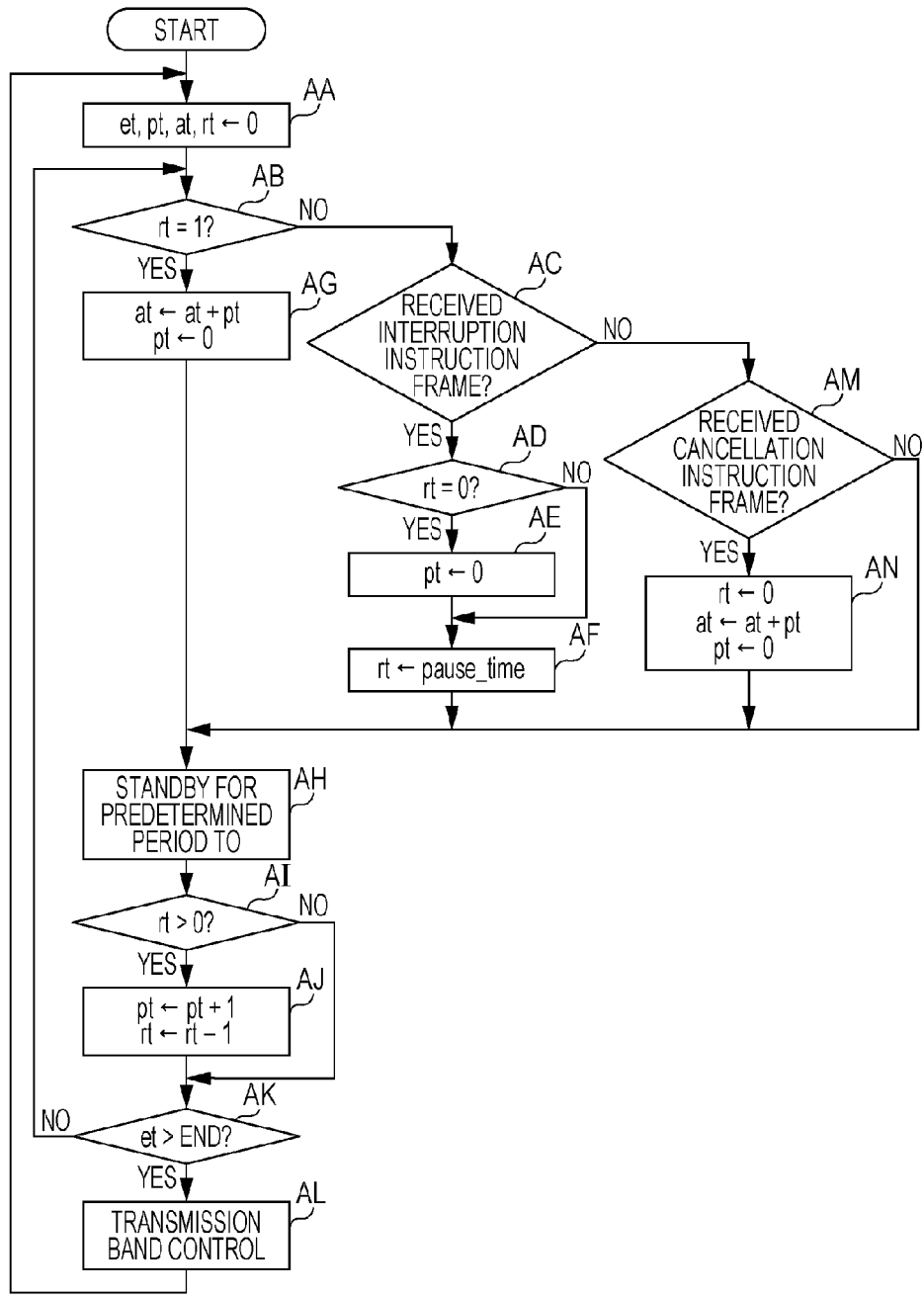
FIG. 5 is a flowchart illustrating a first example of an operation of changing a transmission band by a transmission apparatus.

FIG. 5 is a flowchart illustrating a first example of an operation of changing a transmission band by the transmission apparatus 6. A series of operations which will be described with reference to FIG. 5 may be interpreted as a method including a plurality of procedures.

In an operation AA, the band determination section 31 assigns an initial value of "0" to variants "et", "pt", "at", and "rt". The variant "et" is a counter variant used for measuring the expiration of a measurement period in which the transmission interruption period is measured by the pause frame. The variant "et" is set to be "0" at each time a measurement period starts and increases by 1 with a predetermined period TO. When the variant "et" reaches a predetermined value END, the measurement period is expired. The predetermined period TO may be set in accordance with a unit of the transmission interruption period specified by the pause frame. For example, the predetermined period TO may be a 512 bit time.

The variant "pt" is a counter variant used for measuring an elapsed time during the transmission interruption period. The variant "pt" increases by 1 with the predetermined period TO. In the variant "at", a cumulative value of the variant "pt" is stored. When the variant "pt" is added to the cumulative value stored in the variant "at", the variant "pt" is reset to be "0".

The variant "rt" is a counter variant used for measuring the expiration of the transmission interruption period specified by each pause frame. When the pause frame having the pause_time of a value other than "0" is received, the value of the pause_time is assigned to the variant "rt". The variant "rt" reduces by 1 with the predetermined period TO until the variant "rt" reaches "0". Note that, in the following description and the accompanying drawings, the pause frame that has the pause_time of a value other than "0" and thus instructs the opposing apparatus to interrupt frame transmission might be referred to as an "interruption instruction frame". Also, the pause frame that has the pause_time of "0" and thus instructs the opposing apparatus to cancel interruption of frame transmission might be hereinafter referred to as a "cancellation instruction frame".

In an operation AB, the band determination section 31 determines whether or not the variant "rt" is "1", that is, whether or not the transmission interruption period specified by the interruption instruction frame has reached an expiation time. If the variant "rt" is "1" (the operation AB: Y), the operation proceeds to an operation AG. If the variant "rt" is not "1" (the operation AB: N), the operation proceeds to an operation AC.

In the operation AC, the band determination section 31 determines whether or not the pause-frame detection section 30 has received the interruption instruction frame. If the interruption instruction frame has been received (the operation AC: Y), the operation proceeds to an operation AD. If the interruption instruction frame has been received (the operation AC: N), the operation proceeds to an operation AM.

In the operation AD, the band determination section 31 determines whether or not the variant "rt" is "0", that is, whether or not a current time point is in a period other than the transmission interruption period. If the variant "rt" is "0" (the operation AD: Y), the operation proceeds to an operation AE. If the variant "rt" is not "0" (the operation AD: N), the operation proceeds to an operation AF. In the operation AE, the band determination section 31 resets the variant "pt" to "0" in order to count the elapsed time of the transmission interruption period that newly starts.

On the other hand, when the interruption instruction frame is newly transmitted before the ongoing transmission interruption period is expired, the determination made in the operation AD is "N" and the operation AE is not executed. As a result, a count value for the elapsed time of the transmission interruption period that newly starts is added to the variant "pt", obtained by counting the elapsed time of the transmission interruption period before the interruption instruction frame is received.

After the operation AE, the operation proceeds to the operation AF. In the operation AF, the band determination section 31 updates the variant "rt" with the pause_time of the received interruption instruction frame. Thereafter, the operation proceeds to an operation AH.

When the determination made in the operation AB is "Y", that is, when the transmission interruption period specified by the interruption instruction frame has reached an expiration time, in the operation AG, the band determination section 31 adds the variant "pt" to the cumulative value stored in the variant "at". The band determination section 31 resets the variant "pt" to "0". By the operation AG, the count value for the variant "pt" obtained by counting the transmission interruption period specified by each interruption instruction frame is accumulated on the variation at. Thereafter, the operation proceeds to the operation AH.

In the operation AH, the band determination section 31 stands by for the predetermined period TO. In an operation AI, the band determination section 31 determines whether or not the variant "rt" is larger than "0", that is, whether or not the current time point is in the transmission interruption period. If the current time point is in the transmission interruption period (the operation AI: Y), the operation proceeds to an operation AJ. If the current time is not in the transmission interruption period (the operation AI: N), the operation proceeds to an operation AK.

In the operation AJ, the band determination section 31 increases the variant "pt" by 1 and reduces the variant "rt" by 1. In the operation AK, the band determination section 31 determines whether or not the variant "et" is larger than the predetermined value END, that is, whether or not the predetermined measurement period has been expired. If the variant "et" is larger than the predetermined value END (the operation AK: Y), the operation proceeds to an operation AL. If the variant "et" is equal to or smaller than the predetermined END (the operation AK: N), the operation returns to the operation AB.

In the operation AL, the band determination section 31 determines, in accordance with the predetermined value END corresponding to the measurement period and the variant "at" corresponding to the cumulative period for the transmission interruption period, whether or not the transmission band of the ODUflex of the path is to be reduced. For example, the band determination section 31 may be configured to obtain the ratio of the cumulative period to the measurement period in accordance with the predetermined value END and the variant "at" and calculate the effective transfer rate of the path in accordance with the ratio and the ensured transfer band. The band determination section 31 may be configured to compare the ensured transfer band and the effective transfer rate and determine whether or not the transfer band is to be reduced in accordance with whether or not the resultant difference or the ratio exceeds a threshold.

For example, the band determination section 31 may be configured to determine, when the number of TSs currently ensured in the client data is "n", whether or not the number of TSs ensured in the client data is to be reduced by 1 in accordance with whether or not ((END−at)/END) is smaller than ((n−1)/n). When the band determination section 31 determines that the transmission band is to be reduced, the band control section 32 reduces the transmission band of the ODUflex. Thereafter, the operation returns to the operation AA.

In an operation AM, the band determination section 31 determines whether or not the pause-frame detection section 30 has received the cancellation instruction frame. If the cancellation instruction frame has been received (the operation AM: Y), the operation proceeds to an operation AN. If the cancellation instruction frame has not been received (the operation AM: N), the operation proceeds to the operation AH.

In the operation AN, the band determination section 31 resets the variant "rt" to "0". As a result, increase of the variant "pt" in the operation AJ in subsequent operations is prohibited and counting of the elapsed time of the transmission interruption period is stopped. Also, the band determination section 31 adds the variant "pt" to the cumulative value stored in the variant "at". The band determination section 31 resets the variant "pt" to "0". Thereafter, the operation proceeds to the operation AH.

5. Advantages

According to this embodiment, the transmission apparatus of the transmission network via which the second frame in which the asynchronous frame is arranged is transmitted detects congestion of the asynchronous frame in an asynchronous transmission network. When congestion has occurred in the asynchronous frame, the transmission apparatus adjusts, in accordance with an actual transmission rate, the transfer band ensured in the path for the second frame in which the asynchronous frame is arranged. As a result, the efficiency of use of the band of the transmission network via which the second frame is transmitted is improved.

6. Variations

In the operation illustrated in FIG. 5, the band determination section 31 determines whether or not the transmission band of the ODUflex is to be reduced for each predetermined measurement period, and the band control section 32 reduces the transmission band in accordance with a result of the determination each time the band determination section 31 performs determination. In another embodiment, the band control section 32 may be configured to reduce, when the band determination section 31 has determined for a predetermined number of times that the transmission band of the ODUflex is to be reduced, the transmission band.

Also, the band determination section 31 may be configured to prohibit, when the transmission band currently ensured in the path is a predetermined lower limit, reduction of the transmission band. For example, when the number of TSs currently ensured in the path is the predetermined lower limit, the band determination section 31 prohibits reduction of the number of the TSs. By setting such a lower limit, the band of the path may be ensured.

Second Embodiment

Figure 6:
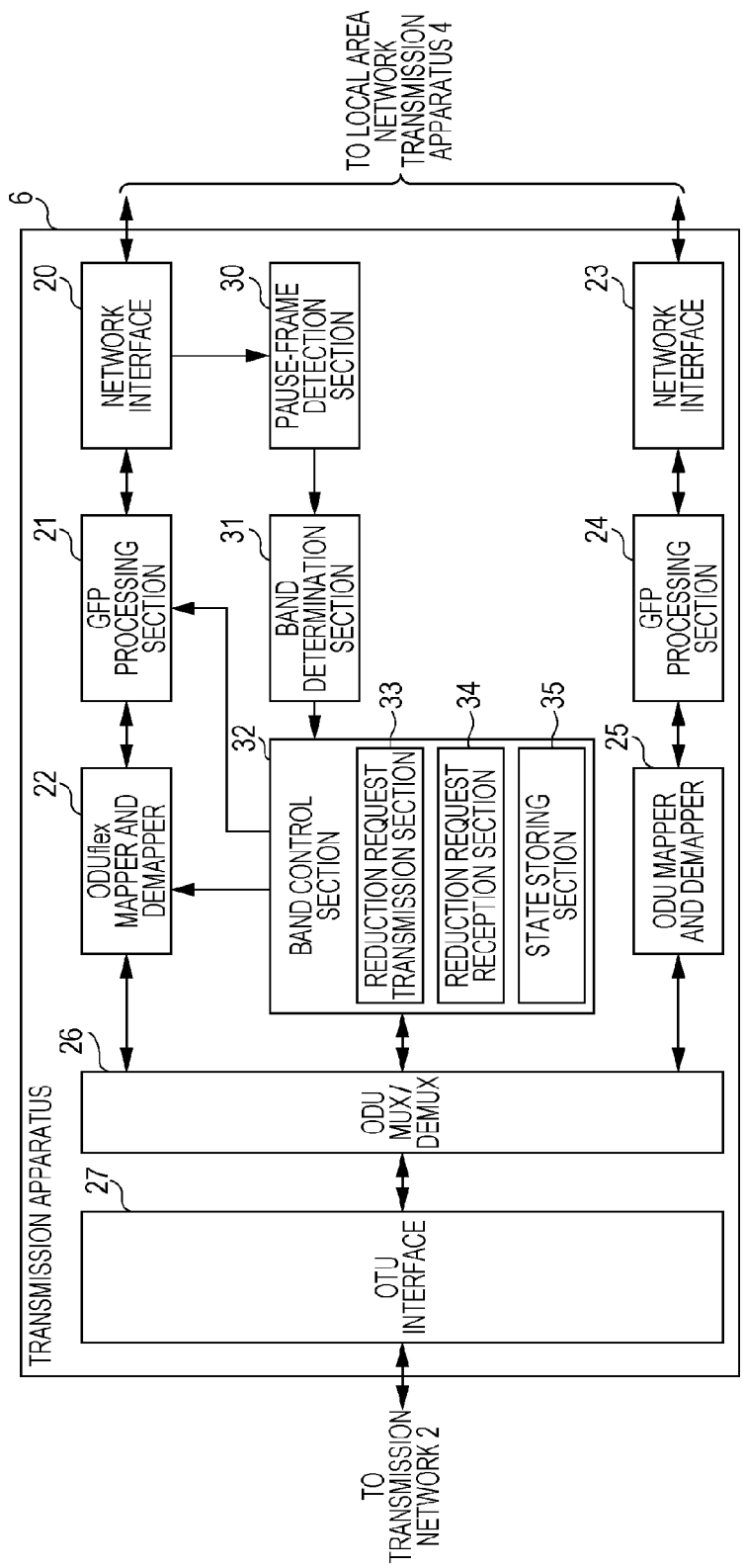
FIG. 6 is a block diagram illustrating a second example of a functional configuration of a transmission apparatus.

Subsequently, another embodiment of the transmission apparatus 6 will be described. In this embodiment, only when the band determination sections 31 of both of the transmission apparatuses 6 that oppose to each other determine to reduce the transmission band, the transmission band of the bidirectional ODUflex used for transmitting data between the transmission apparatuses 6 that oppose to each other is reduced. FIG. 6 is a block diagram illustrating a second example of the functional configuration of the transmission apparatus 6. The same components as those illustrated in FIG. 3 are identified by the same reference numerals and the description of the same functions will be omitted.

The band control section 32 includes a reduction request transmission section 33, a reduction request reception section 34, and a state storing section 35. When the band determination section 31 determines to reduce the transmission band of the ODUflex in accordance with a determination made by the same operation as that of FIG. 5, the reduction request transmission section 33 transmits a reduction request signal giving a request for reduction of the transmission band of the ODUflex. The reduction request signal is multiplexed to the ODU signal by the ODU MUX/DEMUX 26.

When the reduction request signal is transmitted, the band control section 32 changes the value of a flag stored in the state storing section 35 from "0" to "1". The value "1" of the flag represents that the reduction request signal has been sent to an opposing transmission apparatus 6, and the value "0" of the flag represents that the reduction request signal has not been sent. The reduction request reception section 34 receives the reduction request signal transmitted from the opposing transmission apparatus 6. The band control section 32 receives the reduction request signal from the opposing transmission apparatus 6 and, when the value of the flag stored in the state storing section 35 is "1", the band control section 32 reduces the transmission band of the ODUflex.

Similar to the first embodiment, the band control section 32 may be configured to transmit, when reducing the transmission band of the ODUflex, the reduction instruction signal. The reduction instruction signal and the reduction request signal may be sent, for example, using the second bit and the third bit in the first row of the fifteenth column of the ODUk-TSOH. That is, using these two bits, (1) a state where reduction of the transmission band of the ODUflex is neither requested nor instructed, (2) a state where reduction of the transmission band of the ODUflex is requested, and (3) a state where reduction of the transmission band of the ODUflex is instructed may be represented.

Figure 7:
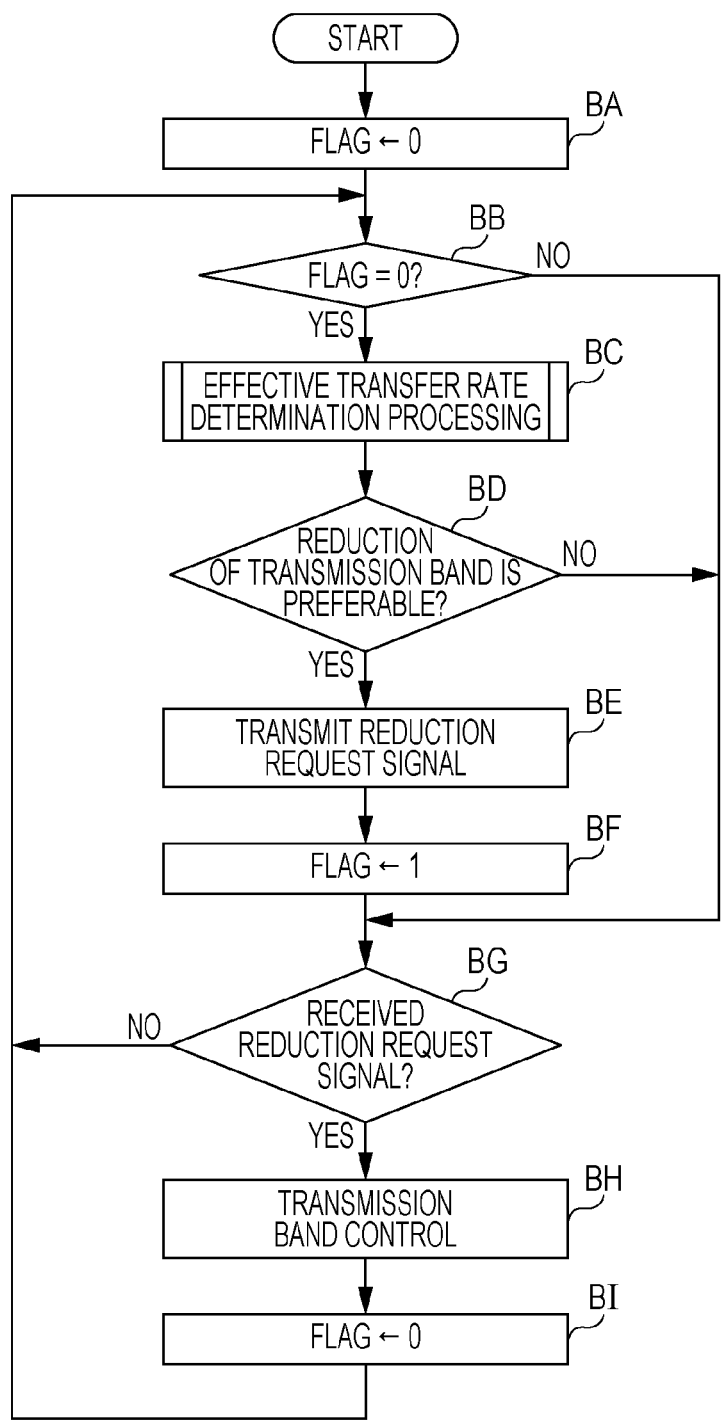
FIG. 7 is a flowchart illustrating a second example of an operation of changing a transmission band by a transmission apparatus.

FIG. 7 is a flowchart illustrating a second example of the operation of changing the transmission band by the transmission apparatus 6. In an operation BA, the band control section 32 resets the value of the flag to "0". In an operation BB, the band control section 32 determines whether or not the value of the flag is "0". When the value of the flag is "0" (the operation BB: Y), the operation proceeds to an operation BC. When the value of the flag is not "0" (the operation BB: N), the operation proceeds to an operation BG.

In the operation BC, the band determination section 31 determines whether or not the transmission band of the ODUflex is to be reduced by determination processing regarding the effective transfer rate of the path, which is similar to the operation described with reference to FIG. 5. When it is determined that reduction of the transmission band is preferable (an operation BD: Y), the operation proceeds to an operation BE. When it is determined that reduction of the transmission band is not to be performed (the operation BD: N), the operation proceeds to the operation BG.

In the operation BE, the reduction request transmission section 33 transmits the reduction request signal to an opposing transmission apparatus 6. In an operation BF, the band control section 32 sets the value of the flag to "1". Thereafter, the operation proceeds to the operation BG.

In the operation BG, the band control section 32 determines whether or not the reduction request reception section 34 has received the reduction request signal transmitted from the opposing transmission apparatus 6. When it is determined that the reduction request signal has been received (the operation BG: Y), the operation proceeds to an operation BH. When it is determined that the reduction request signal has not been received (the operation BG: N), the operation returns to the operation BB.

In the operation BH, the band control section 32 reduces the transmission band of the ODUflex. In an operation BI, the reduction request transmission section 33 resets the value of the flag to "0". Then, the operation returns to the operation BB.

According to this embodiment, a bidirectional path is set between the transmission apparatuses 6 and, even when a request for increasing and reducing the transmission band in the bidirectional path at the same time is given, the transmission band may be adjusted in accordance with a frame congestion state in the asynchronous transmission network.

Third Embodiment

Subsequently, still another embodiment of the transmission apparatus 6 will be described. In this embodiment, a path in which a transmission band used for transmitting an ODUflex signal is insufficient is detected and the transmission band of the path is increased. According to this embodiment, when a path in which a transmission band is reduced according to the first embodiment or the second embodiment is insufficient, the transmission band of the path is increased, and thus, insufficiency of the transmission band may be reduced.

Figure 8:
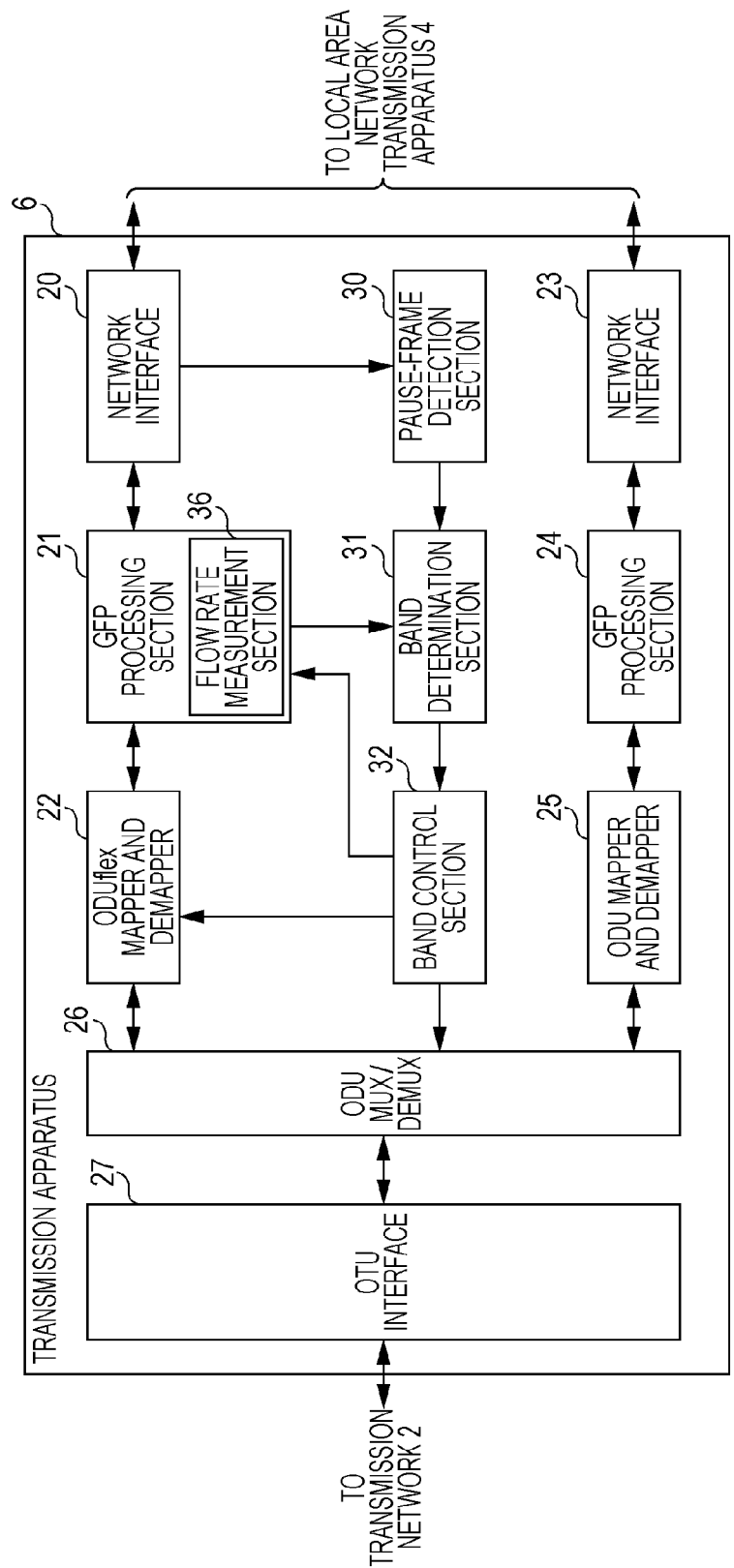
FIG. 8 is a block diagram illustrating a third example of a functional configuration of a transmission apparatus.

FIG. 8 is a block diagram illustrating a third example of the functional configuration of the transmission apparatus 6. The same components as those illustrated in FIG. 3 are identified by the same reference numerals and the description of the same functions will be omitted. The GFP processing section 21 includes a flow rate measurement section 36 that measures an actual flow rate of a packet flowing in a path. The flow rate measurement section 36 may be configured to measure an actual flow rate of a packet flowing in a path in which a transmission band has been reduced, for example, according to the first embodiment or the second embodiment.

When the actual flow rate of a packet is maintained to be a value close to an upper limit value of the transmission band ensured for the path, that is, when a remaining transmission band of the path is small, the transmission band of the path might be insufficient. The band determination section 31 calculates an average rate of the actual flow rate of the packet. The band determination section 31 compares a difference or a ratio between the average rate and the transmission band ensured for the path with a threshold to determine whether or not the transmission band is to be increased.

For example, the band determination section 31 may be configured to determine, when the number of TSs currently ensured for the path is "n", whether or not the number of TSs ensured for the path is to be increased by 1 in accordance with whether or not (the average rate/the transmission band) is larger than $((n-1)/n)$. That is, when a band with a smaller number of TSs than the number of TSs currently ensured by 1 is exceeded, the band determination section 31 determines that the transmission band of the path is insufficient.

When increasing the transmission band of the ODUflex, the band control section 32 transmits an instruction signal instructing an opposing transmission apparatus 6 to increase the transmission band of the ODUflex thereof. The instruction signal might be hereinafter referred to as an "increase instruction signal." The increase instruction signal is multiplexed to the ODU signal by the ODU MUX/DEMUX 26. In response to the increase instruction signal, the opposing transmission apparatus 6 increases the number of TSs ensured for the path.

The increase instruction signal may be transmitted, for example, using the second bit and the third bit of the first row of the fifteenth column of the ODUk-TSOH. Also, the increase instruction signal may be transmitted with the reduction instruction signal and the reduction request signal using the combination of these two bits. That is, using these two bits, (1) a state where reduction of the transmission band of the ODUflex is neither requested nor instructed, (2) a state where reduction of the transmission band of the ODUflex is requested, (3) a state where reduction of the transmission band of the ODUflex is instructed, and (4) a state where increase of the transmission band of the ODUflex is instructed may be represented.

According to this embodiment, the transmission band of the path in which the transmission band is insufficient is increased, and thus, reduction in the transmission rate due to a band limitation in the transmission network 2 may be reduced. Also, according to this embodiment, if there is a transmission band which has been released by reduction of the transmission band according to the first embodiment and the second embodiment, the released transmission band may be reallocated to a path in which a transmission band is insufficient.

Figure 9A:
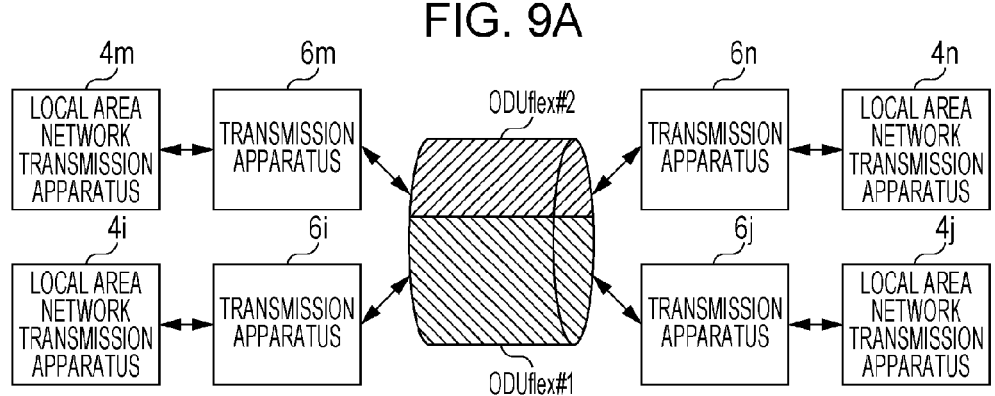
FIGS. 9A to 9C are diagrams schematically illustrating reallocation of a transmission band.
Figure 9B:
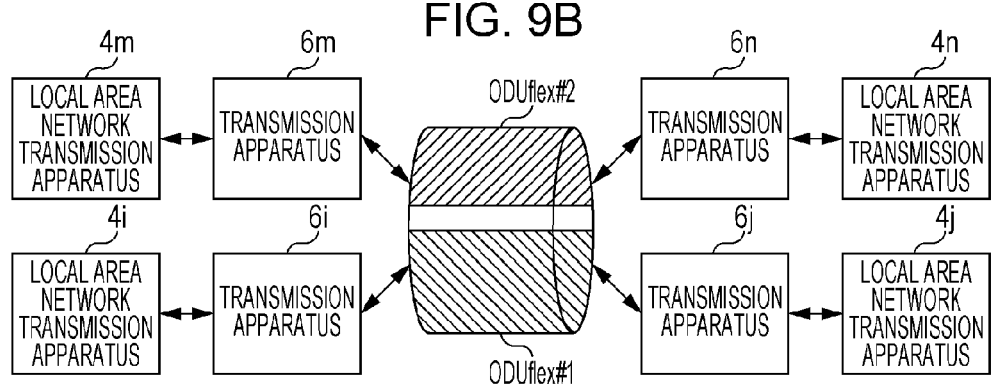
Figure 9C:
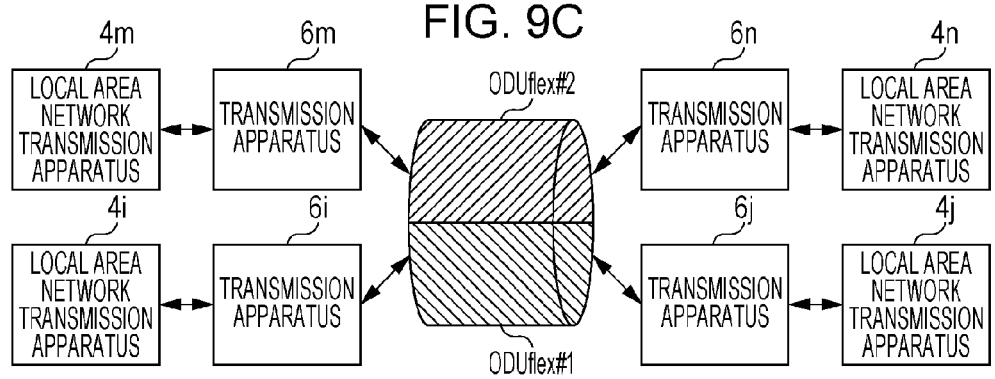

FIGS. 9A to 9C are diagrams schematically illustrating reallocation of a transmission band. In FIGS. 9A to 9C, a packet transmitted via local area network transmission apparatuses 4$i$ and 4$j$ is transmitted by an ODUflex#1 signal flowing in a path set between transmission apparatuses 6$i$ and 6$j$. Also, a packet transmitted via local area network transmission apparatuses 4$m$ and 4$n$ is transmitted by an ODUflex#2 signal flowing in a path set between transmission apparatuses 6$m$ and 6$n$.

Assume that, in FIG. 9A, five TSs are used for the ODUflex#1 signal to ensure a transmission band of 6.25 Gb/s and three TSs are used for the ODUflex#2 signal to ensure a transmission band of 3.75 Gb/s. In this case, if the actual transfer rate of the ODUflex#1 signal is reduced to 4.8 G/s due to packet congestion in the local area network transmission apparatus 4$i$ and/or the local area network transmission apparatus 4$j$, the transmission apparatuses 6$i$ and 6$j$ reduce the number of TSs used for the ODUflex#1 signal to "4", and thus, one TS may be released. This state is illustrated in FIG. 9B.

In this case, if the actual transfer rate of the ODUflex#2 signal is close to the transmission band of 3.75 Gb/s and the transmission band of the ODUflex#2 is insufficient, the transmission apparatuses 6$m$ and 6$n$ may increase the number of TSs used for the ODUflex#2 signal to "4" using the released TS. This state is illustrated in FIG. 9C.

According to this embodiment, a transmission band which has not been used because of frame congestion in the asynchronous transmission network may be reallocated to a path in which a transmission band is insufficient. As a result, the efficiency of use of band of the transmission network in which the second frame is transmitted may be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a frame transmitter configured to receive an asynchronous first frame transmitted via a first transmission network and arrange the received first frame to a second frame to transmit the arranged second frame to a second transmission network, wherein the frame transmitter is configured to detect insufficiency of a remaining transmission band of a path on the second transmission network corresponding to a path on which the first frame that is to be transmitted to an asynchronous transmission apparatus that transmits the first frame via the first transmission network is transmitted;
   a congestion detector configured to detect congestion that has occurred in the asynchronous transmission apparatus, which is different than the transmission apparatus, that receives the first frame via the first transmission network, the congestion detector including a pause-frame detection section that detects the occurrence of congestion in the asynchronous transmission apparatus based on a pause frame transmitted by the asynchronous transmission apparatus; and
   a band controller configured to determine, in accordance with a ratio of a cumulative period of a transmission interruption period specified by the pause frame to a predetermined measurement period, whether or not the transmission band of a path is to be reduced, the path being a path on the second transmission network corresponding to a path on which the congestion has occurred when the congestion has occurred in the asynchronous transmission apparatus, and configured to reduce the transmission band of the path,
   wherein the band controller is configured to control the transmission band of the path in which the insufficiency of the remaining transmission band has been detected so as to increase the transmission band of the path in which the insufficiency of the remaining transmission band has been detected.

2. The transmission apparatus according to claim 1, wherein the band controller prohibits reduction of the transmission band of the path to a transmission band less than a predetermined lower limit.

3. The transmission apparatus according to claim 1, wherein
   the transmission apparatus receives, from another transmission apparatus that transmits the second frame on the second transmission network, a reduction request signal to request for reduction of a transmission band of a path via which the other transmission apparatus transmits the second frame, and
   when the congestion detector detects the occurrence of congestion in the asynchronous apparatus and the reduction request signal for a path on the second transmission network in which the first frame transmitted from the asynchronous transmission apparatus is transmitted is received from the other transmission apparatus, the band controller controls a transmission band of a path so as to reduce the transmission band of a path on the second transmission network corresponding to a path on which an asynchronous frame that is to be transferred to the asynchronous transmission apparatus is transmitted.

4. The transmission apparatus according to claim 1, wherein the band controller detects insufficiency of a remaining transmission band of the path in which a transmission band has been reduced.

5. The transmission apparatus according to claim 1, wherein the frame transmitter measures a flow rate of the first frame transmitted in a path on the second transmission network and detects insufficiency of a remaining transmission band of the path on the second transmission network in accordance with the flow rate.

6. The transmission apparatus according to claim 1, wherein the band controller allocates, to a different path from the path in which the transmission band has been reduced, a free band generated by the reduction of the transmission band to increase the transmission band of the different path in which insufficiency of a remaining transmission band has been detected.

7. A method for controlling a transmission band, the method comprising:
   receiving an asynchronous first frame transmitted via a first transmission network;
   arranging the received first frame to a second frame to transmit the arranged second frame to a second transmission network;

detecting congestion that has occurred in an asynchronous transmission apparatus, which is different than the transmission apparatus, that receives the first frame via the first transmission network, the congestion being detected based on a pause frame transmitted by the asynchronous transmission apparatus;

determining, in accordance with a ratio of a cumulative period of a transmission interruption period specified by the pause frame to a predetermined measurement period, whether or not the transmission band of a path is to be reduced, the path being a path on the second transmission network corresponding to a path on which the congestion has occurred when the congestion has occurred in the asynchronous transmission apparatus, and reducing the transmission band of the path;

detecting insufficiency of a remaining transmission band of a path on the second transmission network corresponding to a path on which the first frame that is to be transmitted to the asynchronous transmission apparatus that transmits the first frame via the first transmission network is transmitted; and controlling the transmission band of the path in which the insufficiency of the remaining transmission band has been detected so as to increase the transmission band of the path in which the insufficiency of the remaining transmission band has been detected.

* * * * *